T. E. MURRAY.
ELECTRICAL WELDING APPARATUS.
APPLICATION FILED NOV. 29, 1916.
1,219,136.
Patented Mar. 13, 1917.
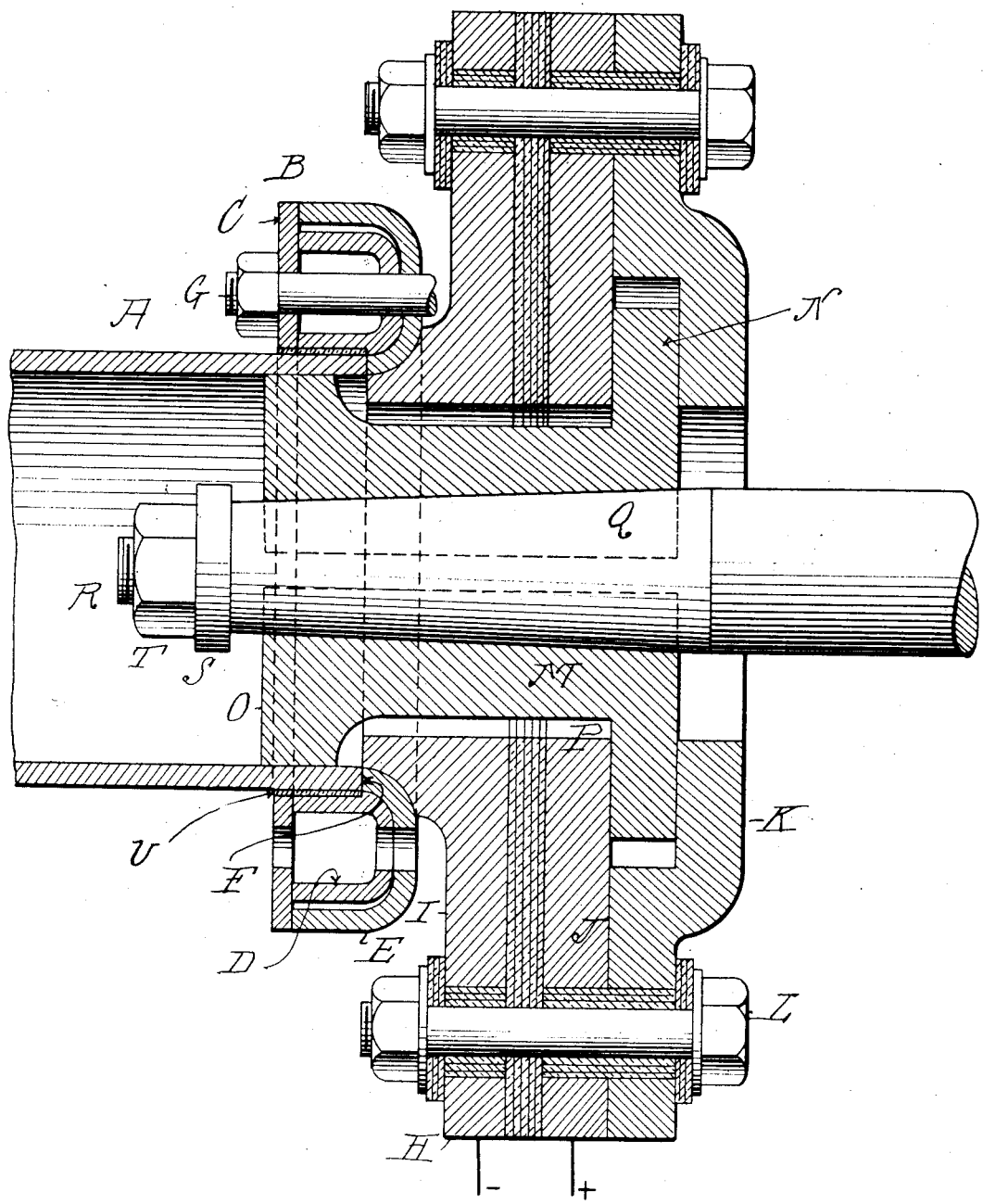

UNITED STATES PATENT OFFICE.

THOMAS E. MURRAY, OF NEW YORK, N. Y.

ELECTRICAL WELDING APPARATUS.

1,219,136.  Specification of Letters Patent.  Patented Mar. 13, 1917.

Application filed November 29, 1916. Serial No. 134,004.

*To all whom it may concern:*

Be it known that I, THOMAS E. MURRAY, a citizen of the United States, residing at New York, in the county of New York and State of New York, have invented a certain new and useful Improvement in Electrical Welding Apparatus, of which the following is a specification.

The object of the invention is to form a welded joint between the butt end of a tube, or pipe, and a circular shoulder on the inner periphery of a sleeve receiving said tube. Said sleeve may form a flange on the end of the tube, or it may be a central projection, a flange plate, or it may be a coupling sleeve, or it may be a socket receiving the tube, or serve any other desired purpose.

The accompanying drawing is a longitudinal section through the tube here shown in welding position, and through the welding electrodes. The particular embodiment of my invention here illustrated is that in which the sleeve, to which the tube is welded, forms a hollow flange on the end of the tube.

A is the tube, and B generally designates the sleeve or flange to be welded thereto. The specific built up form of flange here illustrated is not a part of my present invention. The said flange is formed of an annular plate C, and inner reinforcing ring D, which is U-shaped in cross section and has its edges bearing upon the plate C, and a covering ring E, substantially of U shape, the edge of the outer wall of which rests on said plate C, said ring being arched to extend partially over ring D, the edge of the inner wall of ring E thus forming a shoulder at F. The tube A fits in the annular plate C and ring D, and bears at its butt end against the shoulder F of ring E. The parts of flange B may be connected by bolts, as G, passing through suitable openings. This is one way of producing a sleeve having an internal shoulder F, to which shoulder the end of the tube A is to be welded.

In order to make the welding joint thus located, I construct the electrodes of the machine as follows:

One electrode is an annular plate H having a projection I, which is suitably recessed to afford a seat for the flange B. A second annular plate J, insulated from electrode H, and a cover plate K are connected to electrode H by insulated bolts L.

The other electrode M is tubular in form, and is made in two longitudinally divided half sections as shown by dotted lines. At one end of electrode M is a flange N, which is received in a recess in cover plate K. On the other end of electrode M is a flange O, which enters tube A, so that a portion of the tube wall is received between said flange O and flange B, when the butt end of tube A is brought into contact with shoulder F. The electrodes are preferably made of copper. There is a clearance P between the body portion of the electrode M and the electrode H and plate J, and also between the circumferential periphery of flange N and the recess in cover plate K, to permit of expansion of electrode M. This expansion is effected by a tapered mandrel Q, which is forced into the space between the sections of electrode M, thus causing the flange O to be set outwardly to clamp the tube wall tightly between said flange O and flange B. On the end of the mandrel is a screw threaded rod R, which receives a washer S of greater diameter than said end, and which is held in position against said end by nut T.

In assembling the parts, the cover K is removed. The half sections of electrode M and the mandrel Q are put in position. The flange B is seated on electrode H, and the cover is attached. The inner surface of the flange B, or the outer surface of the tube A near the end, may be coated with any fluid insulating material, indicated at U, and said tube is inserted in the sleeve flange B until its butt end meets the shoulder F. The mandrel Q is now moved inwardly to expand electrode M, and cause the end portion of the tube A to be firmly clamped, as already described. The welding current then being established, traverses the joint at shoulder F, and so welds the butt end of the tube A to said shoulder. The current is then interrupted, and the mandrel Q is moved in the reverse direction, thus unclamping the tube which, with its now attached flange B, is removed. When it is desired to take out electrode M, the cover plate K is removed, and the mandrel Q retracted until the washer S thereon engages said electrode, and enables said electrode to be drawn out by the further retraction of said mandrel.

I claim:

1. An apparatus for electrically making a welded joint between the butt end of a tube and a shoulder within a sleeve receiving said tube, comprising two electrodes respectively in contact with said sleeve and said tube and disposed on opposite sides of said joint.

2. An apparatus for electrically making a welded joint between the butt end of a tube and a shoulder within a sleeve receiving said tube, comprising an electrode constructed to make contact with the exterior of said sleeve, and an electrode constructed to enter said tube and to make contact with the inner periphery thereof.

3. An apparatus for electrically making a welded joint between the butt end of a tube and a shoulder within a sleeve receiving said tube, comprising an electrode constructed to make contact with the exterior of said sleeve, an electrode constructed to enter said tube and to make contact with the inner periphery thereof, and means for expanding said last-named electrode to clamp said tube between said electrode and said sleeve.

4. An apparatus for electrically welding the butt end of a tube to a shoulder within a sleeve receiving said tube, comprising an electrode having an opening, and a recess receiving said sleeve surrounding said opening, an electrode formed in two longitudinally divided half sections disposed in said opening and constructed to make contact with the inner periphery of said tube, and a tapered mandrel entering between said half sections and longitudinally movable to separate said sections to clamp said tube between said sections and said sleeve.

In testimony whereof I have affixed my signature in presence of two witnesses.

THOMAS E. MURRAY.

Witnesses:
GERTRUDE T. PORTER,
MAY T. MCGARRY.